(12) United States Patent
Lai et al.

(10) Patent No.: US 12,620,737 B2
(45) Date of Patent: May 5, 2026

(54) MOTHERBOARD AND CONNECTOR

(71) Applicant: GIGA-BYTE TECHNOLOGY CO., LTD., New Taipei City (TW)

(72) Inventors: Chih-Ming Lai, New Taipei City (TW); Yung-Shun Kao, New Taipei City (TW); Tzu-Hsiang Huang, New Taipei City (TW)

(73) Assignee: GIGA-BYTE TECHNOLOGY CO., LTD., New Taipei City (TW)

( * ) Notice: Subject to any disclaimer, the term of this patent is extended or adjusted under 35 U.S.C. 154(b) by 286 days.

(21) Appl. No.: 18/472,284

(22) Filed: Sep. 22, 2023

(65) Prior Publication Data

US 2024/0128666 A1 Apr. 18, 2024

(30) Foreign Application Priority Data

Oct. 17, 2022 (TW) ................................. 111211262

(51) Int. Cl.
| | |
|---|---|
| *H01R 12/71* | (2011.01) |
| *G06F 1/18* | (2006.01) |
| *G06F 1/185* | (2026.01) |
| *H01R 12/70* | (2011.01) |
| *H01R 12/72* | (2011.01) |

(52) U.S. Cl.
CPC ........... *H01R 12/716* (2013.01); *G06F 1/185* (2013.01); *H01R 12/7023* (2013.01); *H01R 12/721* (2013.01)

(58) Field of Classification Search
CPC .............. H01R 12/716; H01R 12/7023; H01R 12/721; G06F 1/185

USPC ........................................... 439/79, 157, 327
See application file for complete search history.

(56) References Cited

U.S. PATENT DOCUMENTS

| | | | | |
|---|---|---|---|---|
| 5,470,242 A | * | 11/1995 | Cheng ................ | H01R 12/7005 439/157 |
| 5,928,015 A | * | 7/1999 | Tondreault ......... | H01R 12/7005 439/157 |
| 5,959,843 A | * | 9/1999 | Kurrer ................. | H05K 7/1409 361/752 |
| 6,210,195 B1 | * | 4/2001 | Ma ....................... | H01R 12/721 439/327 |
| 6,276,950 B1 | * | 8/2001 | Yodogawa ......... | H01R 12/7005 439/160 |
| 6,375,486 B1 | * | 4/2002 | Yu ....................... | H01R 13/639 439/59 |
| 6,709,283 B2 | * | 3/2004 | Lai ....................... | H01R 13/639 439/153 |

(Continued)

*Primary Examiner* — Tulsidas C Patel
*Assistant Examiner* — Thomas K Quigley
(74) *Attorney, Agent, or Firm* — MUNCY, GEISSLER, OLDS & LOWE, P.C.

(57) ABSTRACT

A motherboard includes a circuit board and a connector mounted on the circuit board. The connector comprises a socket and a latch pivotally mounted on one end of the socket. The latch comprises a body, a pressing member connected to one side of the body and extending outward from one side of the body to the outside of the socket, exposing an area from a side of the interface card for finger pressing. The supporting member is connected to another side of the body, and when the pressing member is pressed, it drives the body to pivot and causes the pushing portion to lift the interface card, and the supporting member stop the body from pivoting by resting against the circuit board.

18 Claims, 6 Drawing Sheets

(56)　　　　　References Cited

U.S. PATENT DOCUMENTS

| | | | | | |
|---|---|---|---|---|---|
| 6,884,100 | B1 * | 4/2005 | Hsiao | H01R 12/721 | 439/327 |
| 7,121,862 | B2 * | 10/2006 | Tang | H01R 12/7005 | 439/327 |
| 7,160,126 | B1 * | 1/2007 | Lai | H01R 13/639 | 439/327 |
| 7,252,523 | B1 * | 8/2007 | Pennypacker | H01R 12/7005 | 439/157 |
| 7,909,627 | B2 * | 3/2011 | Hill | H01R 12/7005 | 439/153 |
| 7,955,100 | B2 * | 6/2011 | Chung | H05K 7/20172 | 439/157 |
| 8,187,031 | B2 * | 5/2012 | Li | H01R 12/737 | 439/567 |
| 8,235,738 | B2 * | 8/2012 | Li | H01R 13/639 | 439/347 |
| 8,277,235 | B2 * | 10/2012 | Lu | H01R 12/7011 | 439/157 |
| 8,858,257 | B2 * | 10/2014 | Mo | H01R 13/62977 | 439/578 |
| 9,017,100 | B2 * | 4/2015 | Lai | H01R 12/7029 | 439/567 |
| 11,507,149 | B2 * | 11/2022 | Petersen, II | G06F 1/185 | |
| 11,868,187 | B2 * | 1/2024 | Chen | G06F 1/185 | |
| 12,185,490 | B2 * | 12/2024 | Kuo | G06F 1/185 | |
| 2003/0143882 | A1 * | 7/2003 | Tsai | H01R 13/639 | 439/327 |
| 2004/0121644 | A1 * | 6/2004 | Ling | H01R 13/629 | 439/353 |
| 2008/0074850 | A1 * | 3/2008 | Kuo | H05K 7/1404 | 361/740 |
| 2011/0021053 | A1 * | 1/2011 | Li | H01R 13/639 | 439/327 |
| 2011/0104926 | A1 * | 5/2011 | Li | H01R 12/737 | 439/327 |
| 2012/0322286 | A1 * | 12/2012 | Fu | H01R 12/7005 | 439/327 |
| 2014/0170883 | A1 * | 6/2014 | Lai | H01R 12/7029 | 439/345 |
| 2017/0187157 | A1 * | 6/2017 | Hsu | H05K 5/0295 | |
| 2021/0184377 | A1 * | 6/2021 | Dong | G06F 1/185 | |
| 2022/0011832 | A1 * | 1/2022 | Petersen, II | H05K 7/1409 | |
| 2023/0282997 | A1 * | 9/2023 | Kuo | H01R 12/7058 | 361/679.32 |
| 2024/0164043 | A1 * | 5/2024 | Tsorng | G06F 1/185 | |

* cited by examiner

MOTHERBOARD AND CONNECTOR

CROSS-REFERENCE TO RELATED APPLICATION

This application claims the benefit of the filing date of Taiwan Patent Application No. 111211262, filed on Oct. 17, 2022, in the Taiwan Intellectual Property Office, the disclosure of which is incorporated herein in its entirety by reference.

BACKGROUND OF INVENTION

Field of the Invention

The present invention relates a computer components, and more particularly to a motherboard and connector.

Description of the Related Art

Interface cards have seen a significant increase in the number of heat dissipation components mounted on them due an increase in their operational efficiency. This not only results in the overall size increase of the interface cards, occupying more space inside the computer casing, and also obstructs a latch. This type of interface cards structures, as exemplified by an interface card A depicted in FIG. 6, when it is inserted into a socket 20 on a circuit hoard B, a latch 9 located at one end of the socket 20 will be obstructed by it due its large size. As a result, the exposed area of the latch 9 is very limited, making it inconvenient for a user to press the latch 9 with a finger.

Furthermore, as shown in FIG. 7, due to the proximity of the latch 9 to the high-temperature interface card A, the material selection for the latch 9 is limited. In addition, considering manufacturing costs, a pivot 91 of the latch 9 is simply placed in an extension portion 30 of the socket 20. Therefore, when the user presses the latch 9 towards the circuit board B, the latch 9 will be pushed and pivot around the pivot 91. However, if pressed too hard, it could easily cause the pivot 91 of the latch 9 to detach from the extension portion 30.

Therefore, finding a solution to solve the inconvenience related to the pressing of the latch and preventing the latch from easily detaching is a pressing issue that the industry urgently wants to address.

SUMMARY OF THE INVENTION

In view of the foregoing problems with the pressing of the latch and the detachment of the latch, the present invention provides a motherboard and connector that can solve the aforementioned issues.

In particular, the present invention includes a connector comprising a socket, an extension portion; and a latch, wherein the socket has a top surface and a bottom surface, the bottom surface is designed to mount on a circuit board, and the top surface is for receiving an interface card, the extension portion is located on one end of the socket, the latch is pivotally mounted on the extension portion, configured to engage or disengage the interface card from the socket. The latch includes a body, a pressing member, a supporting member, wherein the body has a pivot pivotally mounted in the extension portion, and a pushing member configured to lift the interface card, the pressing member is connected to one side of the body and extending outward from one side of the body to the outside of the socket, exposing a pressing portion capable of being pressed by a finger, the supporting member is connected to the other side of the body, when the pressing member is pressed, it will drive the body to pivot and causing the pushing portion to lift the interface card, and the supporting member rests against the circuit board.

In one embodiment, the pressing member of the connector of the present invention includes a first connecting section and a second connecting section connected to the first connecting section, the second connecting section has a pressed portion at its end for finger pressing.

In another embodiment, the first connecting section of the connector of the present invention extends in a direction parallel to the top surface of the socket, and the second connecting section extends upward toward the top surface of the socket.

In one embodiment, a gap is formed between the second connecting section and the interface card of the connector of the present invention.

In one embodiment, the pressed portion of the connector of the present invention has a recess for accommodating a hand tool.

In another embodiment, the supporting member of the connector of the present invention extends to a direction opposite to the extension portion and bends toward the bottom surface of the socket.

In one embodiment, the supporting member of the connector of the present invention comprises two columns, and the columns are oriented in the opposite direction to the pushing portion.

In one embodiment, the end of the supporting member of the connector of the present invention forms a flat surface that rests fully against the circuit board In another embodiment, the distance from the pressed portion to the pivot is greater than a distance from the supporting member to the pivot when the latch is pivotally connected to the extension portion by the pivot.

The present invention further provides a motherboard, the motherboard includes at least one aforementioned connector.

DETAILED DESCRIPTION OF EMBODIMENTS

Figure 1:
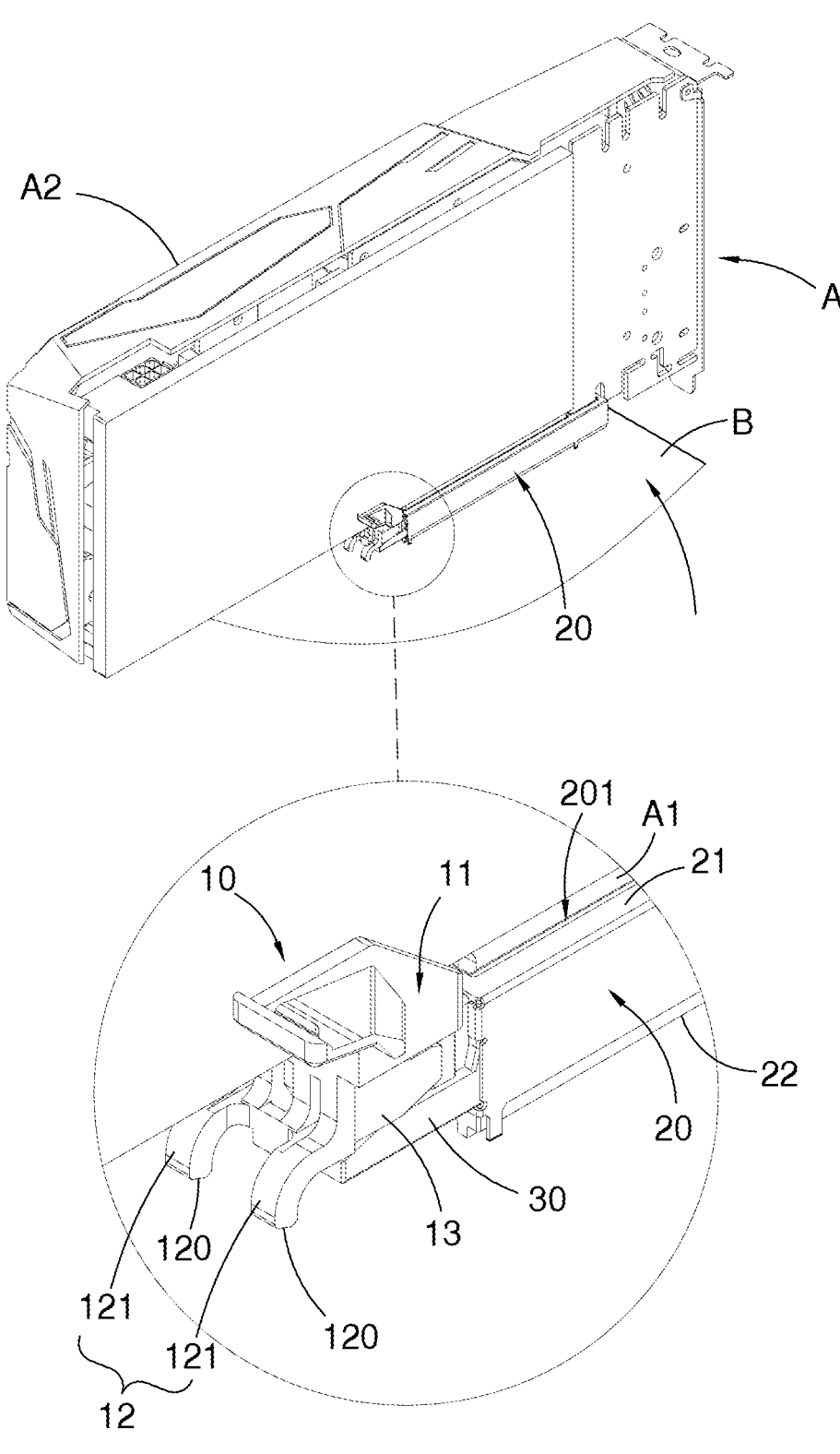
FIG. 1 is a partially enlarged perspective view of the connector of the present invention.
Figure 2:
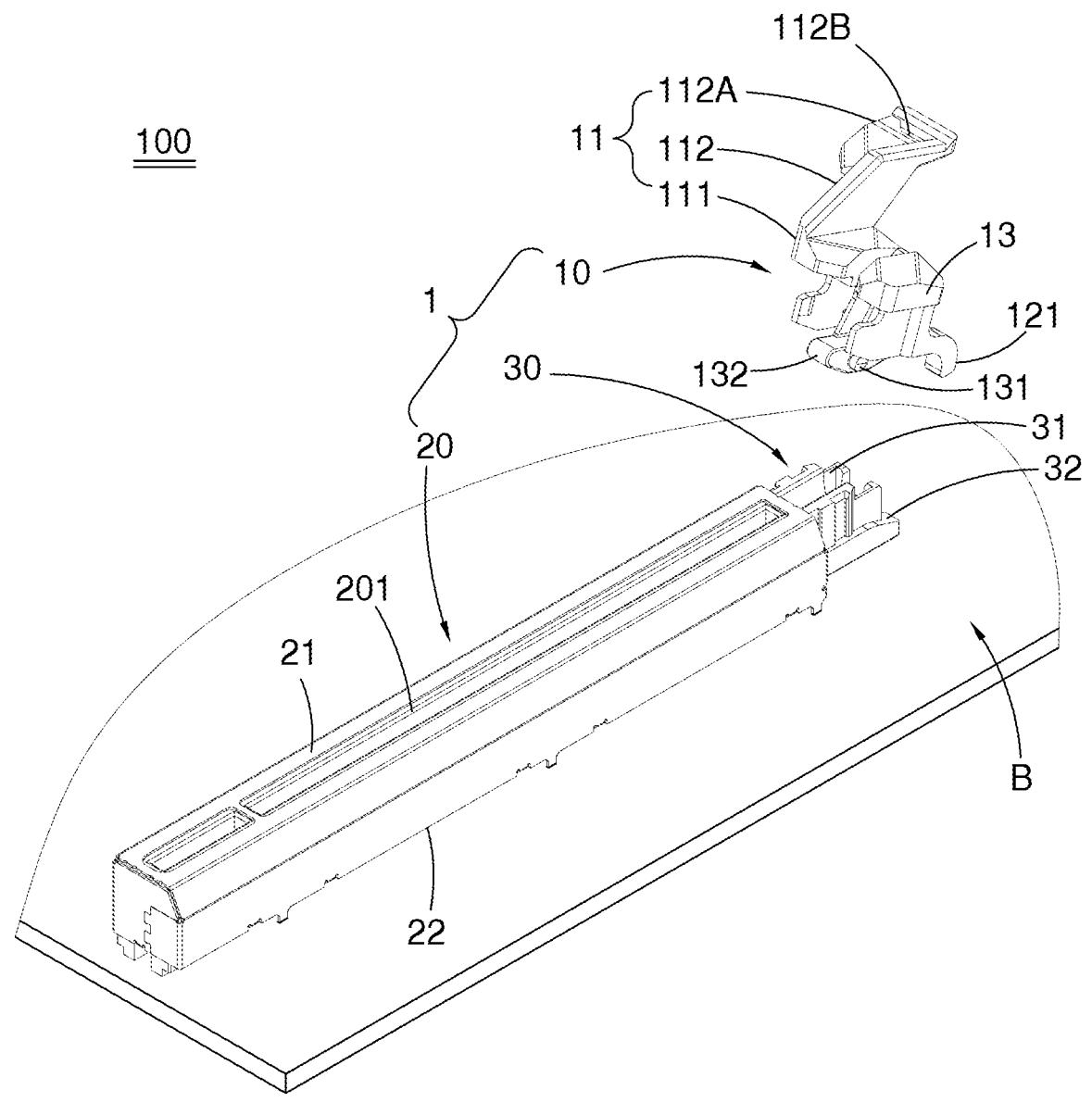
FIG. 2 is a perspective view of the connector of the present invention.

As shown in FIGS. 1 and 2, a motherboard 100 of the present invention comprises a circuit board B and a connector 1 that mount on the circuit board B. The connector 1 includes a socket 20 with a top surface 21 and a bottom surface 22. The bottom surface 22 is designed to be mounted on the circuit board B, while the top surface 21 is for receiving an interface card A. One end of the socket 20 has an extension portion 30, which pivotally mounts a latch 10. Using a computer device as an example, the aforementioned interface card A can be engaged or disengaged from a slot 201 of the socket 20. In this preferred embodiment, the interface card A can be a graphic card, comprising a circuit board A1 and a heat dissipation device A2.

Figure 4:
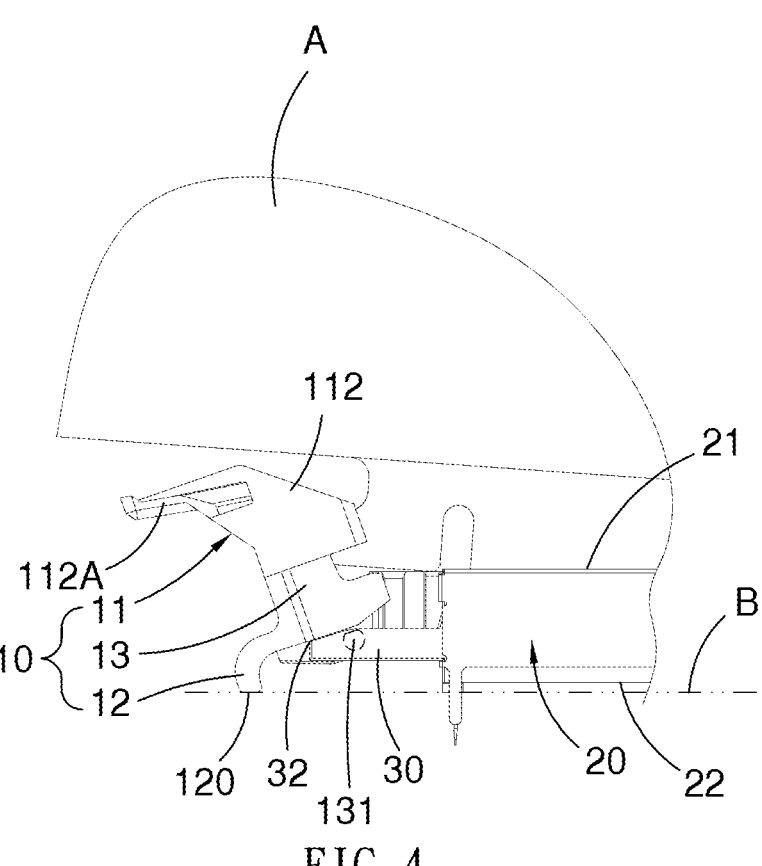
FIG. 4 illustrates the latch of the interface card of the present invention in after being pressed.

The latch 10 of the present invention comprises a latch 10 for disengaging the interface card A from the socket 20. This latch 10 includes a body 13, a pressing member 11, and a supporting member 12. As shown in FIG. 2, the body 13 has a pivot 131, pivotally mounted in the extension portion 30 so that the body 13 is allowed to pivot about the pivot 131 in relation to the socket 20. As depicted in FIGS. 2 and 4, the body 13 has a pushing member 132 on one side facing the interface card A. When the body 13 pivots, the pushing portion 132 can lift the interface card A, causing it to disengage from the socket 20.

Figure 3:
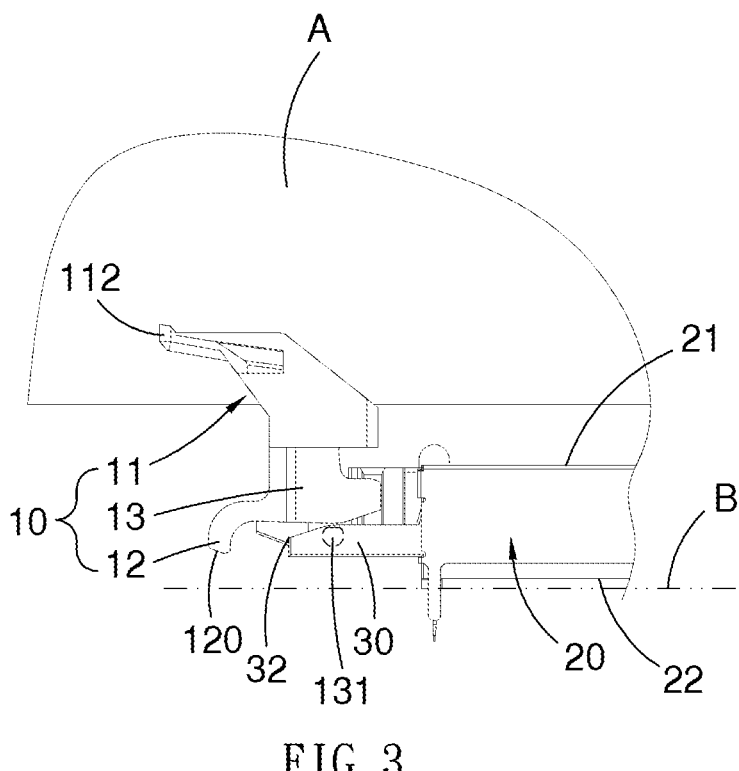
FIG. 3 illustrates the latch of the interface card of the present invention before being pressed.

FIG. 3 illustrates the state wherein the pressing member 11 has not been pressed yet. At this point, the interface card A remains within the socket 20. FIG. 4 demonstrates that the pressing member 11 has been pressed down by the user, causing the body 13 to pivot, disengaging the interface card A from the socket 20. Furthermore, the bottom ends of the two columns 121 form a flat surface 120. When these two columns 121 rest against the circuit hoard B, they are completely pressed against the flat surface 120, ensuring stable support.

Figure 5:
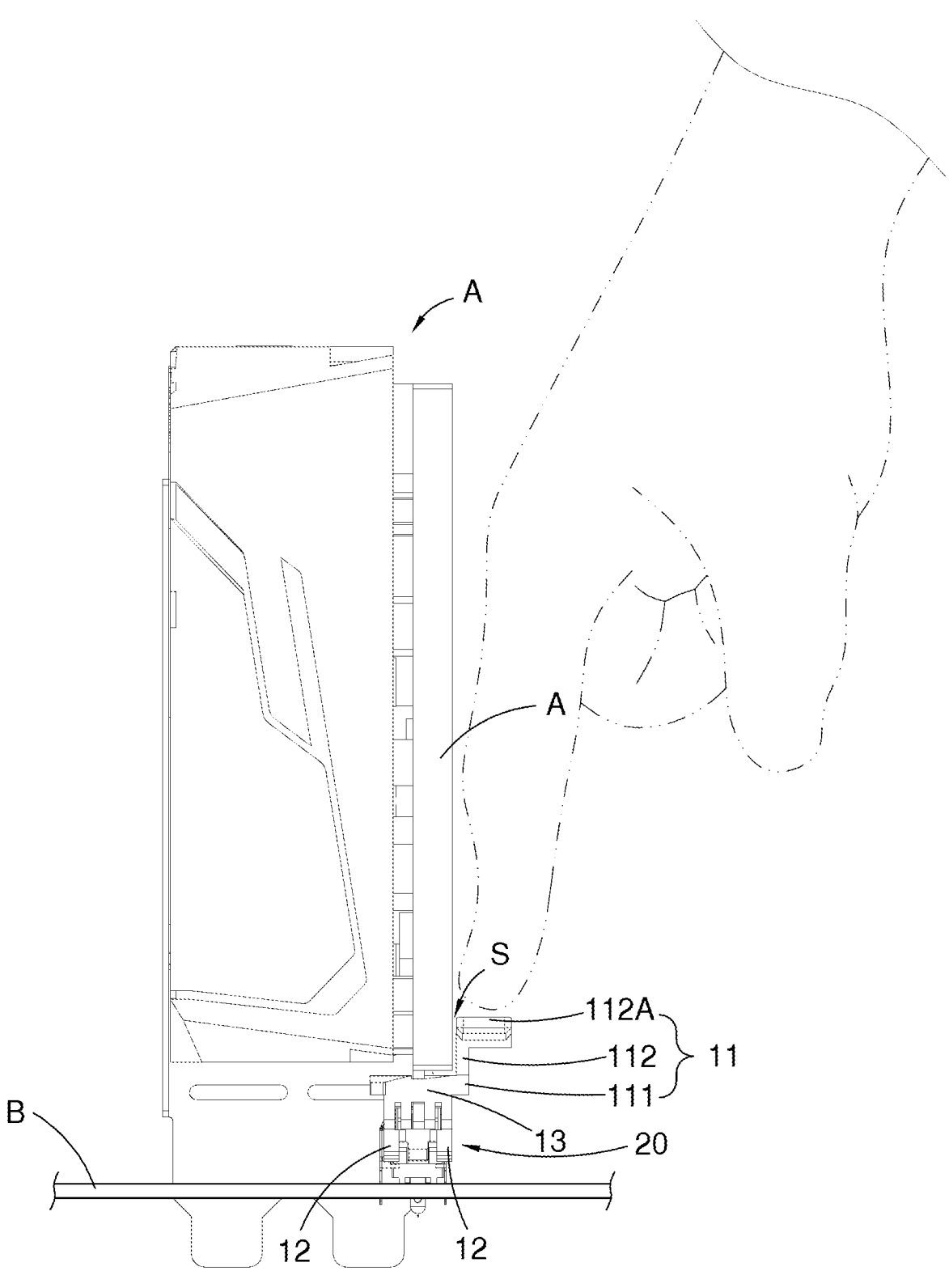
FIG. 5 is a side view of the connector and the interface card of the present invention.
Figure 6:
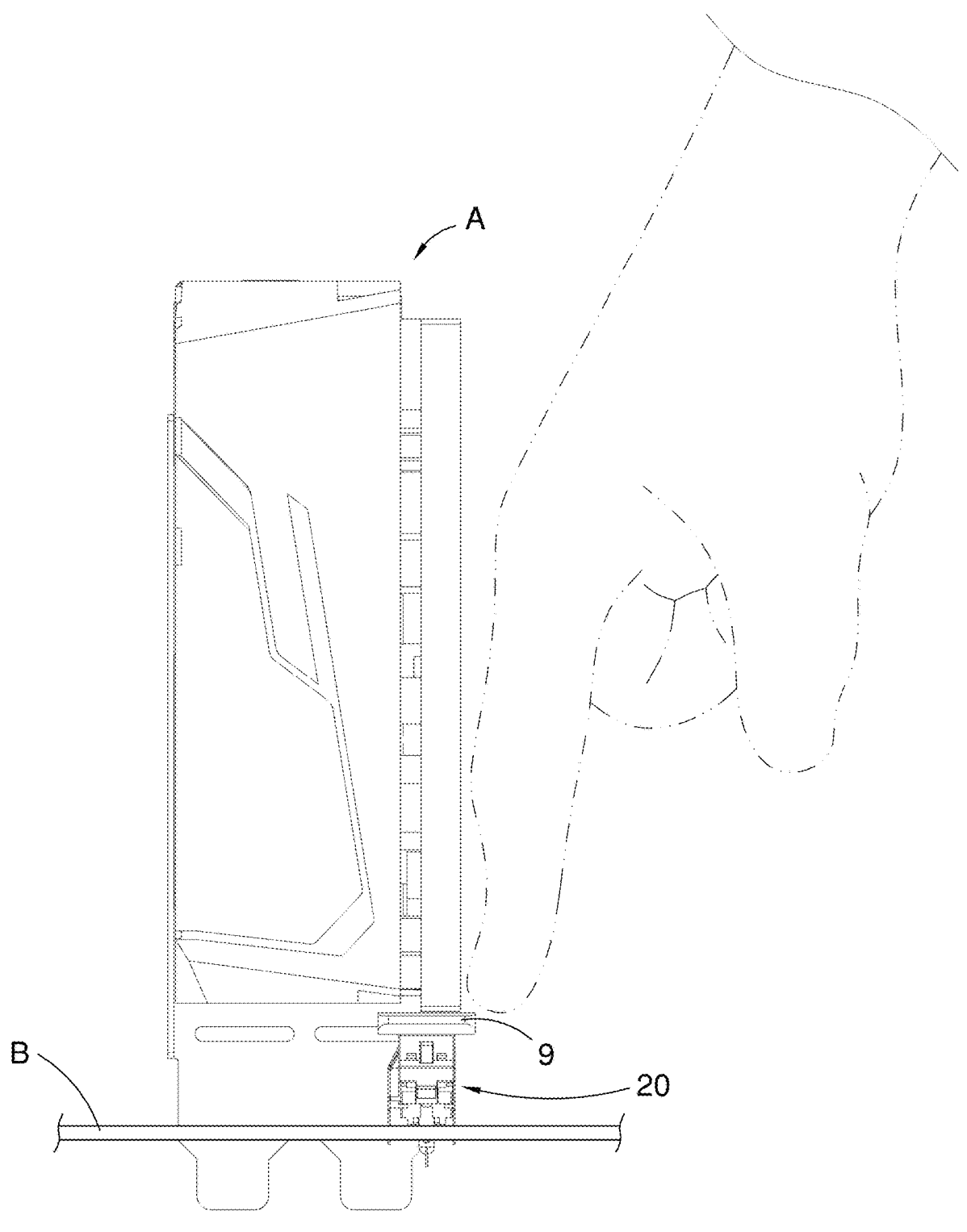
FIG. 6 is a side view of a prior art connector and interface.
Figure 7:
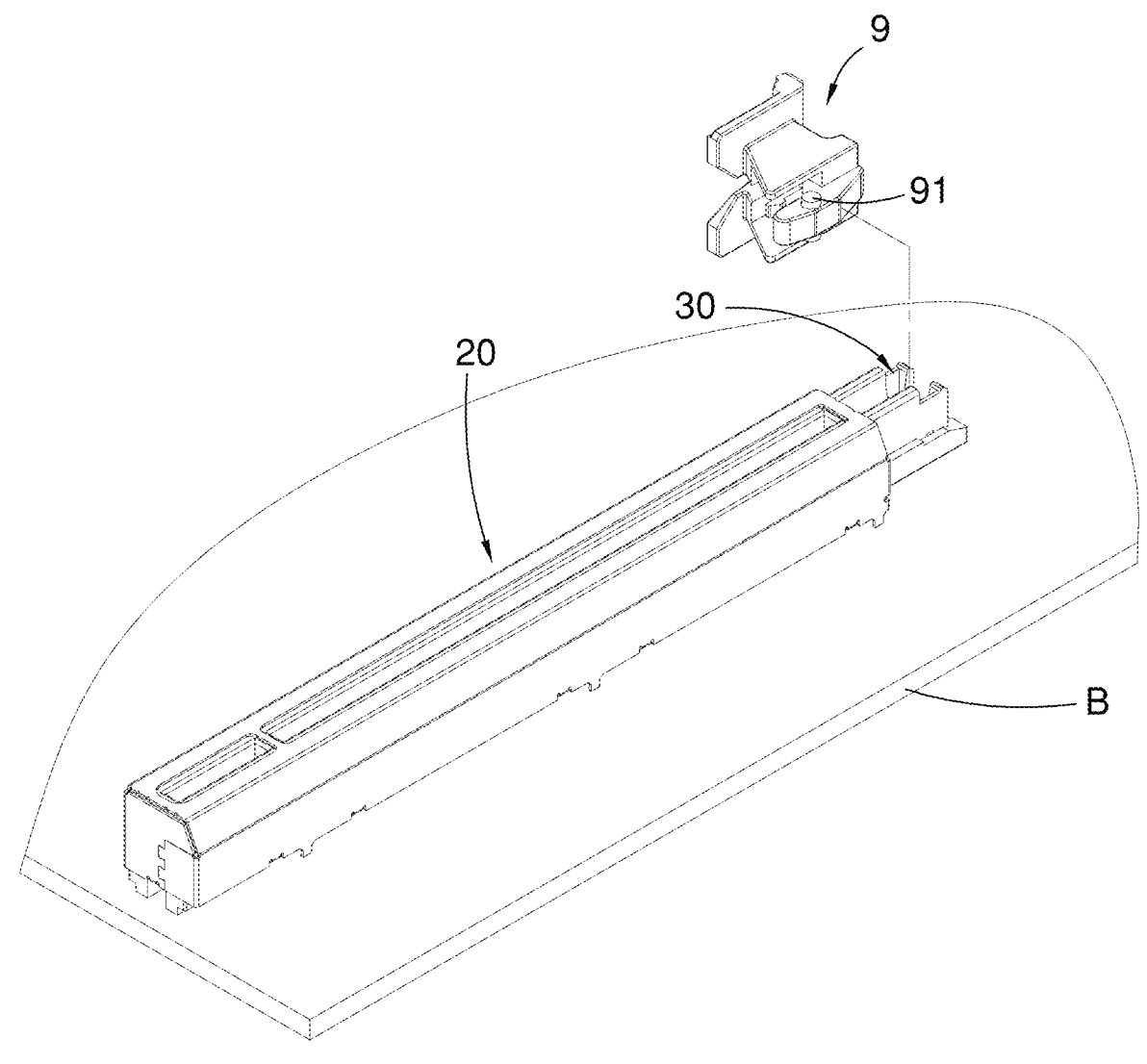
FIG. 7 is a perspective view of a prior art connector.

As shown in FIGS. 2 and 5, in this embodiment, the pressing member 11 is connected to one side of the body 13 and extends outward from the body 13 to the outside of the socket 20. The pressing member 11 comprises a first connecting section 111 and a second connecting section 112, wherein the first connecting section 111 is connected at one end to the body 13, and its other end extends in a direction parallel to the top surface 21 of the socket 20; the second connecting section 112 is connected at one end to the first connecting section 111 and extends above the top surface 21 of the socket 20. The end of the second connecting section 112 has a pressed portion 112A, which offers an area sufficient for the user's finger to press. The first connecting section 111 causes the second connecting section 112 and the pressing portion 112A to protrude and expose from one side of the interface card A, resulting in a clear space above the pressing portion 112A that is not obstructed by the interface card A. Consequently, the user's finger can press the pressed portion 112A without obstruction from the interface card A on its side, pushing the body 13 to pivot through the first connecting section 111 and the second connecting section 112.

Moreover, in this embodiment, the second connecting section 112 extends outward from one side of the interface card A, going upward above the circuit board B, thus elevating the pressed portion 112A so that the user is able to conveniently press it without reaching deep. Meanwhile, the pressing member 11 is connected by the first connecting section 111 and the pressed portion 112A through second connecting section 112, which extends upward and has a certain thickness. This design enhances the pressing member 11's resistance to compression and bending, providing robust mechanical strength. Additionally, a gap S exists between the second connecting section 112 and the interface card A, preventing any interference between the second connecting section 112 and the interface card A while pressing the pressed portion 112A. In this embodiment, as illustrated in FIG. 2, the pressed portion 112A has a recess 112B, providing users to use a hand tool, such as a flathead or Phillips screwdriver, instead of a finger, to engage with the recess 112B, pressing the pressed portion 112A.

Furthermore, as shown in FIGS. 1 and 2, the supporting member 12 is disposed on the body 13 and is oriented in the opposite direction of the pushing member 132. The supporting member 12 comprises two columns 121, which bend towards the bottom surface 22 of the socket 20. While pressing the pressed portion 112A, the body 13 pivots, and the pushing member 132 lifts the interface card A. Subsequently, as the body 13 moves, the two columns 121 rest against the circuit board B, preventing further downward movement of the body 13. In this embodiment, the length of the two columns 121 is designed to rest against the circuit board B precisely when the pushing member 132 just disengages the interface card A from the socket 20.

In this embodiment, as shown in FIGS. 2 and 4, the latch 10 is pivotally mounted in a receiving seat 31 of the extension portion 30 with the pivot 131. On the outer side of the extension portion 30, there is a fulcrum 32. When the pressed portion 112A serves as the point where the force is applied, it can be pushed downward to initiate the pivoting motion of the body 13. Simultaneously, the supporting member 12 moves along with the body 13 to rest against the circuit board B, and the body 13 also rest against the fulcrum 32 (This is not solely limited to this configuration; the supporting member 12 can rest against the motherbo circuit board ard B before the body 13 reaches the fulcrum 32.) At this point, the flat surface 120 of the supporting member 12 provides a counterforce. Specifically, the distance between the flat surface 120, which provides the counterforce, and the fulcrum 32 is greater than the distance between the pivot 131 and the fulcrum 32. In other words, the distance from the pressed portion 112A to the pivot 131 is greater than the distance from the supporting member 12 to the pivot 131. This design makes it less likely for the latch 10 to detach from the receiving seat 31.

Due to the fact that the pressing portion 112A of the latch 10 in the present invention is not obstructed by the large size of the interface card A, it is convenient for users to press. Furthermore, the latch 10 of the present invention utilizes its supporting member 12 to rest against the circuit board B after the interface card A is disengaged from the socket. This prevents the latch 10 from continuing to pivot downward, indicating users to stop applying force, thereby avoiding excessive pressure that could cause the latch 10 to detach.

What is claimed is:

1. A connector comprising:
    a socket having a top surface and a bottom surface opposite to
    each other, wherein the top surface with a slot is adapted for receiving an interface card and the bottom surface adapted to mount on a circuit board;
    an extension portion extending from one end of the socket; and
    a latch pivotally mounted on the extension portion, configured to disengage the interface card from the socket, the latch comprises:
    a body having a pivot pivotally mounted in the extension portion, and a pushing member configured to lift the interface card;
    a pressing member connected to one side of the body and extending outward from one side of the body to the outside of the socket; and
    a supporting member, connected to another side of the body, wherein when the pressing member is pressed, driving the body to pivot and causing the pushing portion to lift the interface card, the supporting member rest against the circuit board.

2. The connector as recited in claim 1, wherein the pressing member includes a first connecting section connected to the body and a second connecting section connected to the first connecting section, the second connecting section having a pressed portion at its end for finger pressing.

3. The connector as recited in claim 2, wherein the first connecting section extends in a direction parallel to the top surface of the socket, and the second connecting section extends upward toward the top surface of the socket.

4. The connector as recited in claim 2, wherein a gap is formed between the second connecting section and the interface card when the interface card is received in the slot of socket.

5. The connector as recited in claim 2, wherein the pressed portion has a recess for accommodating a hand tool.

6. The connector as recited in claim 1, wherein the supporting member extends to a direction opposite to the extension portion and bends toward the bottom surface of the socket.

7. The connector as recited in claim 1, wherein the supporting member comprises two columns, and the columns are oriented in the opposite direction to the pushing portion.

8. The connector as recited in claim 1, wherein the end of the supporting member forms a flat surface that rests fully against the circuit board.

9. The connector as recited in claim 2, wherein a distance from the pressed portion to the pivot is greater than a distance from the supporting member to the pivot.

10. A motherboard comprising a circuit board and a connector mounted on the circuit board, the connector comprising:

a socket having a top surface and a bottom surface opposite to each other, wherein the top surface with a slot is adapted for receiving an interface card and the bottom surface mount on a surface of the circuit board;

an extension portion extending from one end of the socket; and a latch pivotally mounted on the extension portion, configured to disengage the interface card from the socket, the latch comprises:

a body having a pivot pivotally mounted in the extension portion;

a pushing member configured to lift the interface card;

a pressing member connected to one side of the body and extending outward from one side of the body to the outside of the socket; and a supporting member, connected to another side of the body, wherein when the pressing member is pressed, driving the body to pivot and causing the pushing portion to lift the interface card, the supporting member rest against the circuit board.

11. The motherboard as recited in claim 10, wherein the pressing member includes a first connecting section connected to the body and a second connecting section connected to the first connecting section, the second connecting section having a pressed portion at its end for finger pressing.

12. The motherboard as recited in claim 11, wherein the first connecting section extends in a direction parallel to the top surface of the socket, and the second connecting section extends upward toward the top surface of the socket.

13. The motherboard as recited in claim 11, wherein a gap is formed between the second connecting section and the interface card when the interface card is received in the slot of socket.

14. The motherboard as recited in claim 11, wherein the pressed portion has a recess for accommodating a hand tool.

15. The motherboard as recited in claim 10, wherein the supporting member extends to a direction opposite to the extension portion and bends toward the bottom surface of the socket.

16. The motherboard as recited in claim 10, wherein the supporting member comprises two columns, and the columns are oriented in the opposite direction to the pushing portion.

17. The motherboard as recited in claim 10, wherein the end of the supporting member forms a flat surface that rests fully against the circuit board.

18. The connector as recited in claim 11, wherein a distance from the pressed portion to the pivot is greater than a distance from the supporting member to the pivot.

* * * * *